(12) United States Patent
Brand et al.

(10) Patent No.: US 6,707,042 B2
(45) Date of Patent: Mar. 16, 2004

(54) APPARATUS FOR READING CODES OF THERMOLUMINESCENCE DETECTORS

(75) Inventors: Hans-Norbert Brand, München (DE); Markus Figel, München (DE)

(73) Assignee: Forschungszentrum Karlscruhe GmbH, Karlsruhe (DE)

( * ) Notice: Subject to any disclaimer, the term of this patent is extended or adjusted under 35 U.S.C. 154(b) by 111 days.

(21) Appl. No.: 10/123,011

(22) Filed: Apr. 12, 2002

(65) Prior Publication Data

US 2003/0193027 A1 Oct. 16, 2003

(51) Int. Cl.$^7$ ................................ G01T 1/115
(52) U.S. Cl. ................ 250/337; 250/341.1; 250/341.6; 250/484.3; 250/271
(58) Field of Search ............................ 250/337, 271, 250/341.6, 341.1, 484.3

(56) References Cited

U.S. PATENT DOCUMENTS

| | | | | |
|---|---|---|---|---|
| 3,638,017 A | * | 1/1972 | Jones et al. | 250/337 |
| 3,809,901 A | * | 5/1974 | Szalanczy et al. | 250/337 |
| 4,727,253 A | * | 2/1988 | Bruml et al. | 250/337 |
| 4,835,388 A | * | 5/1989 | Bruml et al. | 250/337 |
| 5,081,363 A | * | 1/1992 | Tetzlaff et al. | 250/337 |
| 5,083,031 A | * | 1/1992 | Hoelsher et al. | 250/484.3 |
| 5,173,595 A | * | 12/1992 | Langsted | 235/458 |
| 5,656,814 A | * | 8/1997 | Lurie et al. | 250/337 |

FOREIGN PATENT DOCUMENTS

| | | | | |
|---|---|---|---|---|
| DE | 19643316 A1 | * | 4/1998 | G01T/1/11 |
| EP | 499350 A2 | * | 8/1992 | G01T/1/115 |
| WO | WO 9818101 A1 | * | 4/1998 | G06K/19/06 |

* cited by examiner

Primary Examiner—Albert Gagliardi
(74) Attorney, Agent, or Firm—Klaus J. Bach

(57) ABSTRACT

In an apparatus for reading codes of a thermoluminescence detector, a housing including an optical unit is disposed on a base together with a disc-like magazine, which is rotatably supported adjacent the housing and provided with an annular array of recesses receiving the thermoluminescence detectors to be examined. The housing has a side opening through which the magazine extends into the housing, in which a light source is disposed for the homogeneous illumination of the thermoluminescence detectors from one side thereof, A CCD camera is disposed in the housing at the other side of the magazine for recording the illuminescence generated by the detectors when exposed to the light from the light source for determining the radiation exposure of thermoluminescence detectors.

9 Claims, 1 Drawing Sheet

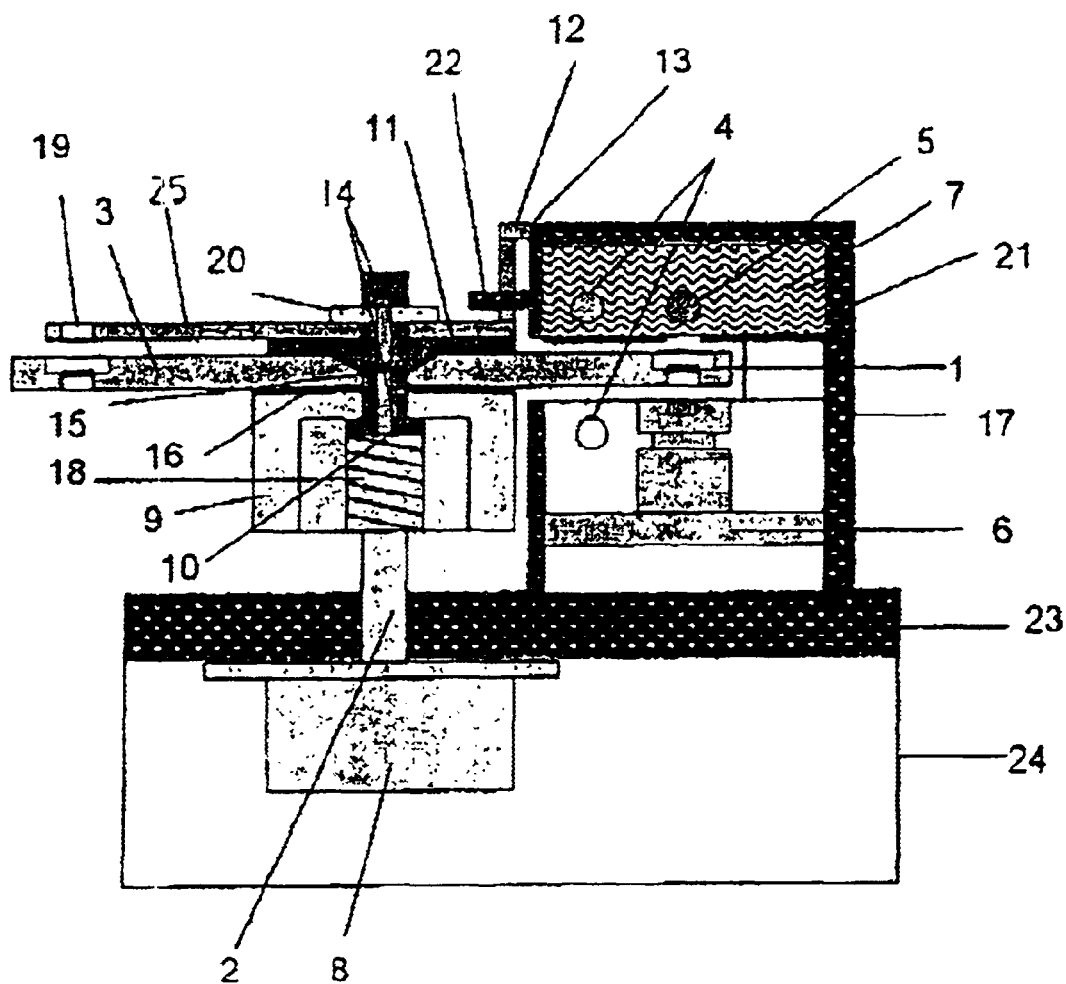

APPARATUS FOR READING CODES OF THERMOLUMINESCENCE DETECTORS

BACKGROUND OF THE INVENTION

The invention relates to an apparatus for reading codes of thermoluminescence detectors, wherein the thermoluminescence detectors are arranged in a disc-like round magazine all at the same distance from the axis of the magazines.

With the official fingering dosimeter system dosimeter probes as they are know from DE 196 43 347.7 with marked TL detectors according to DE 196 43 316.9 are utilized. The identification numbers in the omnidirectional code, which are disposed on the detectors (size $3.1 \times 3.1 \times 1$ mm$^3$ or $13.9 \times 1$ mm$^3$ must be read for the assignment of the individual calibration factor of each detector in order to determine the dose. This is done with commercially available components such as video cameras with stands and decoders, wherein each detector has to be brought manually in a reading position. For an efficient evaluation in corresponding automatic measuring apparatus, the detectors are placed into round magazines. If detectors were lost during the surveillance period of a month, the magazine locations where the lost detectors would normally be placed, must be left unoccupied for operational reasons, since the evaluation is performed on the basis of dosimeter numbers, no matter whether the respective detectors are present or not. This requires high concentration and attention of the operating personnel. The above reading arrangement offers no possibility to prevent wrong positioning of the detectors on the magazine by the operators and, furthermore, has the disadvantage that, with such an open arrangement for the camera, undesirable light effects to the observation area may result in contrast changes of the code image, whereby the reading accuracy is detrimentally affected. Apparatus, which do not have these disadvantages, are not available commercially.

It is therefore the object of the present invention to provide an apparatus for reading codes of thermoluminescence detectors, which overcome the disadvantages referred to above.

SUMMARY OF THE INVENTION

In an apparatus for reading codes of a thermoluminescence detector, a housing including an optical unit is disposed on a base together with a disc-like magazine which is rotatably supported adjacent a housing and provided with an annular array of recesses receiving the thermoluminescence detectors to be examined. The housing has a side opening through which the magazine extends into the housing, in which a light source is disposed for the homogeneous illumination of the thermoluminescence detectors from one side thereof, A CCD camera is disposed in the housing at the other side of the magazine for recording the luminescence generated by the detectors when exposed to the light from the light source for determining the radiation exposure of thermoluminescence detectors.

It is an important advantage of the apparatus according to the invention that it has a relatively small size but provides for optimal reading quality while undesirable lighting effects are eliminated. If furthermore permits only a proper placement of the detectors on the magazine. Also, control by a PC is facilitated.

Below, the invention will be described in greater detail on the basis of the accompanying drawings.

BRIEF DESCRIPTION OF THE DRAWINGS

The sole FIGURE is a cross-sectional view of an exemplary apparatus according to the invention.

DESCRIPTION OF AN EMBODIMENT

The apparatus for reading codes as shown in the figure comprises a base 23, an interface housing 24 and a housing 17 provided at a site with a slot and together forming a support structure for all the other components of the apparatus. On the shaft 2 of a PC-controlled electric motor 8, a transport plate 9 is disposed, which is covered by an anti-skid foil 16, and which includes integrated therewith a magazine centering and locking mechanism 20. A permanent magnetic centering bolt 10, which is biased by a spring 18 extends into the center of the magazine 3 disposed on the anti-skid foil 16. In cooperation with the slotted housing 17, which is disposed parallel to the motor axis and which includes the optical reader system and into which the magazine 3 projects, the bolt 10 centers the magazine on the transport plate 9 and locks it thereto by a central locking structure including a magnet 14.

At the top edge, the housing 17 is provided with a partial cover 25 with which the center of the magazine 3 can be covered and which extends up to the edge of the magazine 3. It includes therein an insert opening 19 for providing the insert location of the magazine to indicate to the operating personnel the location for the sensors. The partial cover 25 is adjustably supported on the housing 17 by a pivot joint 13 and an arm 12 provided with a stop 22, which prevents the partial cover 25 when lowered, from contacting the magazine 3.

This partial cover 25 of the magazine 3, which can be pivoted open, includes in the geometric center of the magazine 3 a conical permanent magnet 14, which is supported on the bolt 10 so as to be freely rotatable therewith but can be locked in position by the locking mechanism. A pressure plate 11 is provided which is biased by the magnet 14 toward the magazine when the pressure plate has been lowered onto the magazine 3 and which projects from the top downwardly into the magazine.

Together with the permanent magnetic centering bolt 10 of the transport plate 9, the permanent magnet 14 provides for a force-locking connection with the transport plate 9 and consequently forms a clamping structure for the magazine 3, which consists of aluminum. The magazine 3 is pressed by the pressure plate 11 onto the anti-skid foil 16 of the transport plate 9 for firm engagement therewith.

Between the permanent magnetic centering bolt 10 of the transport plate 9 and the lowered cone-shaped permanent magnet 14 in the pressure plate 11 of the partial cover 25 remains an air gap 15 of about 0.5 mm when the magazine 3 is inserted. The air gap 15 accommodates tolerances in the thickness of the magazine 3 at about equal engagement pressures and permits a jerk-free lifting of the partial cover 25. As a result, no detector will jump out of the magazine 3 upon lifting of the cover.

The optical components, that is, a video camera 6 operating in the macro range and having automatic exposure control, a stabilized LED light source 5 adapted to the sensitivity of the camera and a light barrier 4 for the magazine position control are arranged in the cylindrical housing 17, which is closed at the bottom and the top in a light-tight manner so that no outside light can enter. The magazine 3 extends into the housing 17 and the center of the cylinder coincides geometrically with the center position of the detector 1 on the magazine 3.

The electronically controlled and stabilized light source 5 is arranged within the housing 17 in a cylindrical light scattering body 7, which is transparent only in the needed exposure area. Outside this area, the light scattering body is made opaque and dull and provided with a light reflective layer 21 so that undesirable light effects for example by reflection from outer illumination changes are prevented. Light may for example enter by way of the open area through which the magazine extends into the housing 17 in which the lens system is disposed and affect therein the image contrast. The light scattering body is tightly fitted into the housing 17.

The apparatus can be controlled by a commercially available PC, which is not shown in the drawings, but which is provided with the appropriate hardware components for the motor control for the video picture analysis and for the decoding of the code.

With individual adaptation, the apparatus according to the invention may also be integrated into commercially available measuring apparatus.

What is claimed is:

1. An apparatus for reading codes of thermoluminescence detectors comprising a base with a housing including an optical unit, a disc-like magazine rotatably supported on said base adjacent said housing and having formed therein, in an annular array, recesses receiving said thermoluminescence detectors such that they are all arranged at the same distance from the axis of rotation of said disc-like magazine, and a drive module for rotating said magazine, said housing having an opening through which said disc-like magazine extends into said housing, and including a light source for the homogeneous illumination of the thermoluminescence detectors, a light carrier sensor structure for determining the position of the thermoluminescence detector relative to said light source and a CCD camera for recording the luminescence generated by said detectors when exposed to the light from said light source.

2. An apparatus according to claim 1, wherein said light source is a light emitting diode combined with a light scattering body for a homogeneous illumination of said thermoluminescence detectors without the need for optical components (lenses).

3. An apparatus according to claim 1, wherein the housing in which said optical unit is disposed is light-tight and has only a slot snugly receiving said disc-like magazine, the axis of rotation of said magazine extending parallel to the axis of said CCD camera.

4. An apparatus according to claim 1, wherein said module comprises an electric motor with a shaft, a transport plate connected to the shaft of said electric motor and a clamping structure for engaging said magazine with said transport plate.

5. An apparatus according to claim 4, wherein said clamping structure comprises a spring-supported centering bolt supported on said transport plate and a pressure plate for biasing said magazine into engagement with said transport plate, said pressure plate being supported by a partial cover for said magazine which is pivotally supported so as to be removable together with said pressure plate.

6. An apparatus according to claim 5, wherein said pressure plate is pivotally supported together with said partial cover by a support arm hinged to the housing in a way to provide for some axial and radial freedom.

7. An apparatus according to claim 6, wherein said pressure plate and said centering bolt include magnets arranged in the centers thereof for clamping the magazine onto the transport plate.

8. An apparatus according to claim 7, wherein said magnets are so arranged that a small air gap remains between them when the partial cover and the pressure plate are in a closed position.

9. An apparatus according to claim 4, wherein an anti-skid foil is disposed on said transport plate for improving engagement of said magazine with said transport plate.

* * * * *